United States Patent

Horikoshi et al.

[11] Patent Number: 5,849,377
[45] Date of Patent: Dec. 15, 1998

[54] INJECTION-MOLDED HOLLOW ARTICLE, HOLLOW INJECTION MOLDING METHOD AND METAL MOLD THEREFOR

[75] Inventors: Maki Horikoshi, Kawasaki; Yuji Tanaka, Yokohama; Keiji Nishiura, Kawasaki, all of Japan

[73] Assignee: Asahi Kasei Kogyo Kabushiki Kaisha, Osaka, Japan

[21] Appl. No.: 927,283

[22] PCT Filed: Jan. 29, 1992

[86] PCT No.: PCT/JP92/00087

§ 371 Date: Sep. 24, 1992

§ 102(e) Date: Sep. 24, 1992

[87] PCT Pub. No.: WO92/13699

PCT Pub. Date: Aug. 20, 1992

[30] Foreign Application Priority Data

Jan. 30, 1991 [JP] Japan .................................. 3-027629

[51] Int. Cl.⁶ .................................................. B29D 22/00
[52] U.S. Cl. ........................ 428/35.7; 428/116; 428/118; 428/119; 428/166; 428/178; 428/188; 428/73; 425/577; 425/572; 264/328.7; 264/572
[58] Field of Search .................................. 428/35.7, 188, 428/178, 116, 118, 119, 73, 166; 264/572, 328.7; 425/130, 577

[56] References Cited

U.S. PATENT DOCUMENTS

| | | | |
|---|---|---|---|
| 3,135,640 | 6/1964 | Kepka | 264/572 |
| 3,538,668 | 11/1970 | Anderson | 52/800 |
| 3,767,742 | 10/1973 | Robin et al. | 264/45.2 |
| 3,793,415 | 2/1974 | Smith | 425/577 |
| 4,052,523 | 10/1977 | Rhodes et al. | 428/116 |
| 4,136,220 | 1/1979 | Olabisi | 428/35 |
| 4,247,515 | 1/1981 | Olabisi | 264/500 |
| 4,474,717 | 10/1984 | Hendry | 264/45.5 |
| 4,707,393 | 11/1987 | Vetier | 428/178 |
| 4,849,269 | 7/1989 | Grace | 428/81 |

FOREIGN PATENT DOCUMENTS

| | | |
|---|---|---|
| 0014968 | 3/1982 | Japan . |
| 0167217 | 10/1982 | Japan . |
| 61-53208 | 11/1986 | Japan . |
| 64-14012 | 1/1989 | Japan . |
| 3009820 | 1/1991 | Japan . |
| 2252936 | 8/1992 | United Kingdom . |

OTHER PUBLICATIONS

Patent Abstracts of Japan, vol. 14, No. 323 (M–997) 11 Jul. 1990 and JP–A–21 08 510 (Toyoda Gosei Co Ltd) 20 Apr. 1990.

*Primary Examiner*—S. Mark Clardy
*Assistant Examiner*—Michael A. Williamson
*Attorney, Agent, or Firm*—Armstrong, Westerman, Hattori, McLeland & Naughton

[57] ABSTRACT

Disclosed is an injection-molded hollow article having large hollow portions 1 which securely provide the strength required by the injection-molded hollow article without depending upon ribs as more solid remaining portions being unstable in position and size.

A melted resin and pressurized fluid are injected under pressure into a metal mold cavity 4, a movable core 5 projected into the metal mold cavity 4 is moved and then a support portion 2 is formed at the position from which the movable core 5 is moved.

The position and size of the support portion 2 can be determined by selecting the position and size of the movable core 5.

5 Claims, 10 Drawing Sheets

INJECTION-MOLDED HOLLOW ARTICLE, HOLLOW INJECTION MOLDING METHOD AND METAL MOLD THEREFOR

TECHNICAL FIELD

The present invention relates to an injection-molded hollow article having a large hollow portion, a hollow injection molding method for molding the same, and a metal mold therefor. More specifically, the present invention relates to an injection-molded hollow article having hollow portions of widely variable sizes which is reinforced by forming support portions for partially supporting the hollow portions, a hollow injection molding method for molding the same, and a metal mold therefor.

BACKGROUND ART

Conventionally, when an injection-molded hollow article having hollow portions is molded by injecting a melted resin of an amount smaller than the volume of a metal mold cavity when under pressure a pressurized fluid (mainly composed of a gas) is injected into the metal mold cavity, a necessary strength is obtained by partial retaining webs (hereinafter, referred to as a web or rib) which is a structure partially connected to the skin portion of the molded article.

For example, U.S. Pat. No. 4,247,515 discloses that key stocks are attached to a metal mold cavity and the viscosity, elasticity and density of a melted resin, the interfacial tension between a pressurized fluid and the melted resin, and the like are adjusted. Since the portions of the metal mold cavity to which the key stocks are attached has a decreased thickness and thus the pressurized fluid is difficult to cross over, a plurality of hollow portions are formed around the boundaries of the key stocks attached and the resin remains in the vicinity of the key stocks and solid ribs are formed from this resin.

Further, Japanese Patent Kokoku (Post Exam. Publication) No. Sho 61-53208 discloses that a distribution is provided with the fluidity and amount of a melted resin in a metal mold cavity and a gas is introduced to the portion of the melted resin having a high fluidity and the portion containing a less amount of the melted resin in the metal mold cavity to make these portions hollow and the other portions remain as solid ribs. In addition, this patent discloses a method in which a melted resin and gas are introduced under pressure into a metal mold cavity provided with a portion having a different thickness and a method in which a melted resin and gas are introduced under pressure to a metal mold cavity while the metal mold cavity is partially enlarged, to thereby preferentially introduce the gas to the thick portion and enlarged portion of a metal mold cavity to make these portions hollow. The resins in the thin portions and the portions other than the enlarged portions of the metal mold are retained as solid ribs. Further, said invention discloses use of these methods in combination.

Figure 18:
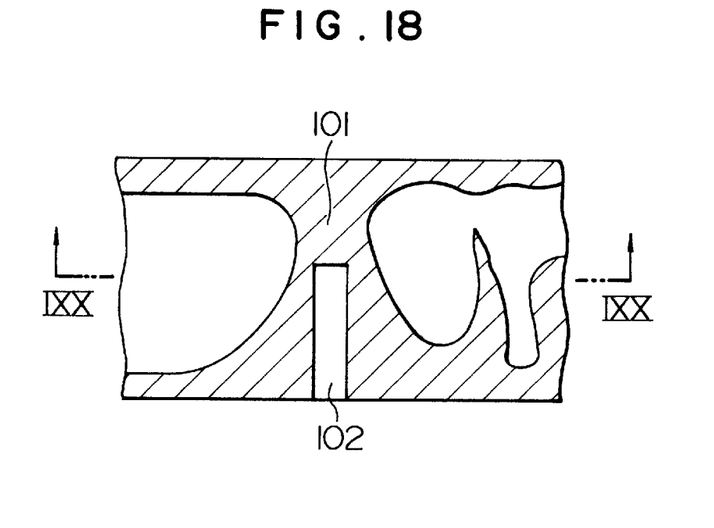
FIG. 18 is a view explaining prior art.
Figure 19:
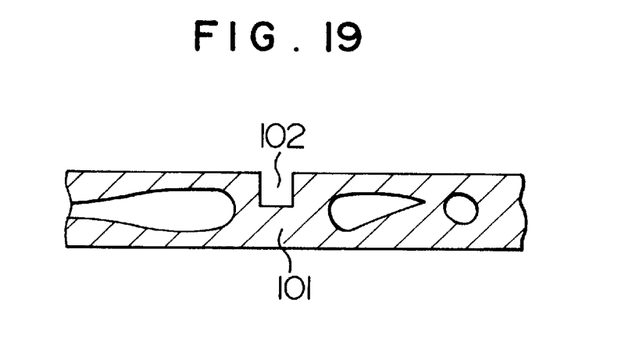
FIG. 19 is a view explaining the prior art taken along the line XIX—XIX of FIG. 18.

According to the method disclosed in U.S. Pat. No. 4,247,515, if high key stocks are attached to the metal mold cavity, a portion to which the pressurized fluid is supplied can be securely isolated. However, if a portion corresponding to the high key stocks is made in a deep recess of an injection-molded hollow article and making the wall thickness of a rib thinner, the strength of the molded product is thus lowered. Although this reduction of the strength can be prevented by lowering the height of the key stocks, this lowering of the height makes the separation of the portion to which the pressurized fluid is introduced inaccurate. Since the location and size of the ribs are liable to be controlled by chance, the position of the ribs cannot be designed in advance. Therefore, as shown in FIGS. 18 and 19, a molded article obtained has ribs 101 having an irregular location and shape and the ribs 101 having a necessary size cannot be securely placed at the location which is really required, and thus a molded article having a desired strength cannot be obtained. Further, a recess 102, which originally is not needed in consideration of an object for which an injection-molded hollow article is used, is formed in the molded article by the key stocks attached to the metal mold cavity.

Figure 20:
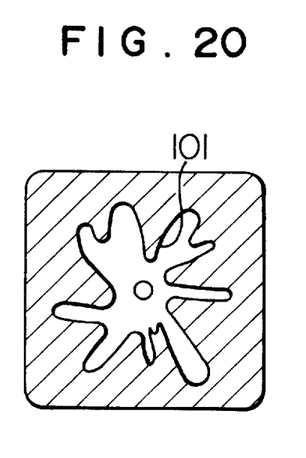
FIG. 20 is a view explaining the prior art.
Figure 21:
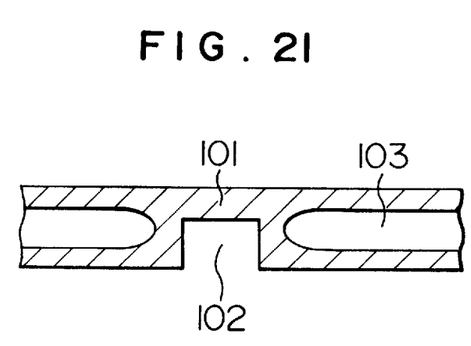
FIG. 21 is a partial view of a molded article according to the prior art.

Further, since various factors are concerned with the method of providing the distribution with the fluidity and amount of the melted resin in the metal mold cavity as in the methods disclosed in Japanese Patent Kokoku No. Sho 61-53208, the distribution of the viscosity and amount of the melted resin in the metal mold cavity cannot be accurately controlled. Therefore, the location and size of ribs are also liable to be controlled by chance. As a result, as shown in FIG. 20, a drawback arises in that the location and shape of a rib 101 are made irregular and that not only the location and shape of the rib cannot be as previously designed but also a hollow ratio cannot be made so large. Further, as shown in FIG. 21, the method of using the metal mold cavity having a portion the thickness of which can be partially changed or a portion which can be partially expanded has a problem in that the formation of a recess 102 (or projection) cannot be avoided in an injection-molded hollow member obtained. In particular, when the thickness in the injection-molded hollow article cannot be greatly varied, a gas cannot be preferentially introduced to a thick portion and the location and shape of the ribs 101 are controlled by chance, and thus the ribs cannot be provided as desired. Further, in the case of an injection-molded hollow article with a portion having a given large thickness extended over a wide region, a single hollow portion 103 is formed over this region having a given large thickness, and thus a problem arises in that a hollow portion having a desired size cannot be provided in a core for which a given strength must be maintained.

As described above, the prior art has a great many restrictions in a case where ribs having a desired size are formed at a desired location, and thus the size and shape of an injection-molded hollow article and the size of the hollow portion thereof (hollow ratio) are restricted.

DISCLOSURE OF THE INVENTION

Taking the above problems of the prior art into consideration, an object of the present invention is to provide an injection-molded hollow article with a large hollow portion which is securely provided with a necessary strength by forming ribs at the portion and in the size which are designed in advance.

A further object of the present invention is to provide a method of making an injection molded hollow article securely provided with a target strength without forming unnecessary recesses and differences in thickness.

A first aspect of the present invention relates to a method of the molding above injection-molded hollow member. As illustrated in FIG. 1, a first embodiment of the present invention is a molding method for manufacturing an injection-molded hollow article comprising the steps of injecting a melted resin into a metal mold cavity 4 of a metal mold 6 having a movable core 5 capable of projecting into the metal mold cavity and retracting from a projected position, injecting under pressure a pressurized fluid into the metal mold cavity 4 in the state in which the movable core 5 projects into the metal mold cavity 4, and retracting the movable core 5. Further, as illustrated in FIG. 1, a second embodiment relates to a method of manufacturing an injection-molded hollow article having a desired hollow ratio, which method comprises the steps of injecting a melted resin into the metal mold cavity 4 of a metal mold 6 having a movable core 5 similar to the above movable core wherein the volume of the metal mold cavity can be increased by the movement of a cavity surface 7, supplying under pressure a pressurized fluid into the metal mold cavity 4 in the state that the movable core 5 projects into the metal mold cavity, and increasing the volume of the metal mold cavity by the retraction of the movable core and the movement of the cavity surface of the metal mold.

As shown in FIGS. 4–6, FIGS. 7–9 and FIGS. 10 and 11, a second aspect of the present invention relates to an integrally molded article which has a hollow ratio of 20 to 90% and support portions 2 of a predetermined size integrally connected between surfaces confronting through a hollow portion.

Further, a third aspect of the present invention relates to a metal mold used for molding an injection-molded hollow article. As shown in FIG. 1, this metal mold has a movable core 5 disposed at a position where a support portion 2 is integrally connected to surfaces confronting through the hollow portion 1 of an injection-molded hollow article 3 to be molded and is capable of projecting into a metal mold cavity 4 and retracting from a projected position.

DESCRIPTION OF REFERENCE NUMERALS 1 hollow portion
2 supporting portion
3 injection-molded hollow article
4 metal mold cavity
5 movable core
6 metal mold
7 cavity surface
8 gate
9 sprue
10 valve
11 injection nozzle
12 pressurized fluid nozzle
13 injection cylinder
14 screw
15 check valve
16 valve
17 compression cylinder
18 piston
19 hydraulic cylinder
20 inlet of pressurized fluid

BEST MODE OF CARRYING OUT THE INVENTION

As shown, for example, in FIGS. 4–6, FIGS. 7–9, and FIGS. 10 and 11, an injection-molded hollow article according to the present invention has a hollow ratio of 20–90% and support portions (ribs) 2 with a predetermined size and shape located at predetermined positions in the cross section thereof. Each of these support portions 2 is integrally connected to surfaces confronting through a hollow portion 1 to serve as a support wall or support column. In particular, the injection-molded hollow article shown in FIGS. 4–6 has support portions 2 extending radially from the vicinity of the center thereof, the injection-molded hollow article shown in FIGS. 7–9 has support portions 2 disposed in parallel with each other, and further the injection-molded hollow article shown in FIGS. 10 and 11 has grid-shaped intersecting support portions 2.

The support portion 2 may be formed into a flat wall of, for example, a linear shape, wave shape, polygonal line shape and the like, or a pillar, for example, of a circular shape, square shape or elliptic shape and the like. When the support portion 2 is made into a wall shape, it may be suitably selected from a long wall to a short wall as necessary. Further, when the support portion 2 is made into a pillar shape, the diameter of the support portion 2 may be suitably selected as necessary.

The support portions 2 may be disposed in various arrangements selected from, for example, a radial arrangement, parallel line arrangement, and intersecting arrangement such as, for example a grid arrangement, zigzag arrangement, and the like in accordance with the shape and size of the injection-molded hollow article, the size of the hollow portion 1, and the like. Further, a wall-shaped support portion 2 and pillar-shaped support portion 2 may be mixedly disposed.

As described above, since the support portions 2 of the injection-molded hollow article are arranged as the support walls or support pillars and formed to a predetermined size and shape located at a predetermined position by making use of a movable core to be described later, a necessary strength can be securely maintained even if the hollow portion 1 has a large size.

The above injection-molded hollow member can be molded by using, for example, a flowchart of a hollow injection molding method and a metal mold 6 shown in FIG. 1.

First, as shown in FIG. 1 (a), a melted resin is injected into a metal mold cavity 4. This injection can be carried out in the state that the volume of the metal mold cavity 4 is arbitrarily increased by moving a cavity surface 7 to be described later in addition to a so-called closed state. The state of the metal mold when the melted resin is injected may be selected depending upon the shape and hollow ratio of an injection-molded hollow article to be molded.

A resin used for the present invention is not particularly limited so long as it is melted at a predetermined temperature and can be smoothly moved in a metal mold by a pressurized fluid. More specifically, any thermoplastic resin can be used regardless of the type thereof and, further, any thermosetting resin having the above characteristics can be also used. Of course, a resin to be used may be selected in accordance with the application and shape of a molded article.

Various additives such as a pigment and the like usually used in an injection molding resin may be suitably used in a molding operation.

An amount of a melted resin to be injected into the metal mold cavity is adjusted in accordance with the shape and hollow ratio of a target injection-molded hollow article. When the metal mold cavity 4 is formed to a shape substantially symmetrical with respect to a gate 8 and has no irregular wall thicknesses, the amount of melted resin to be injected into the metal mold cavity is preferably 40–95% of the volume of the metal mold cavity 4 in the state in which a movable core 5 is projected into the metal mold cavity 4. When the metal mold cavity 4 has an irregular wall thickness and thin wall portion, this amount is preferably sufficient to fill the metal mold cavity 4 in the state in which the movable core 5 is projected into the metal mold cavity 4. In the latter case, a hollow ratio is determined by the increase ratio of the volume of the metal mold cavity caused by the retraction of the movable core 5 and the movement of the cavity surface 7.

Note, in the following description, the case in which an injected amount of melted resin is smaller than the amount filling the metal mold cavity with the movable core 5 projected thereinto is referred to as "short shot" and the case in which an injected amount is sufficient to fill the metal mold cavity 4 with the movable core 5 in the same state is referred to as "full shot".

As shown in FIG. 1 (a), although the injection of the melted resin is usually carried out in the state in which the movable core 5 projects into the metal mold cavity 4, the movable core 5 may be projected simultaneously with the injection of the melted resin or after the completion of injection of a predetermined amount of the melted resin.

Figure 1A:
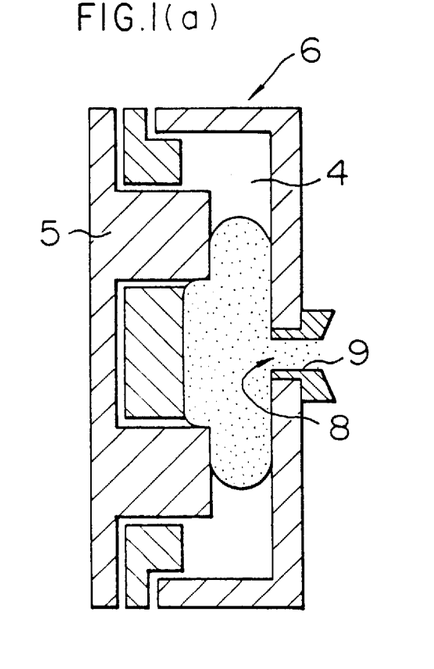
FIG. 1 is a flowchart of a hollow injection molding method according to the present invention and a view explaining a metal mold used for the method.
Figure 1B:
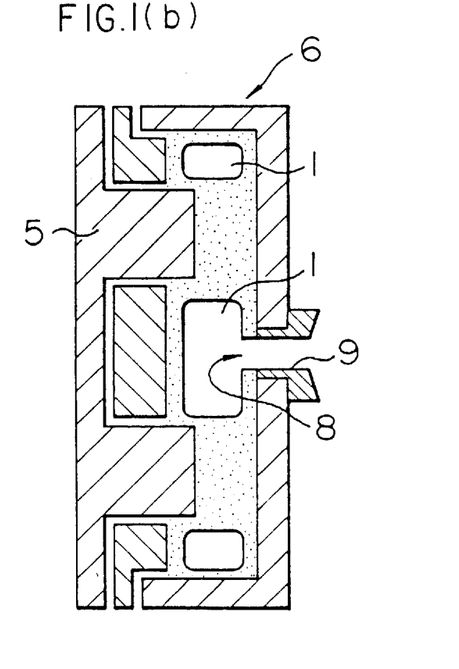
Figure 1C:
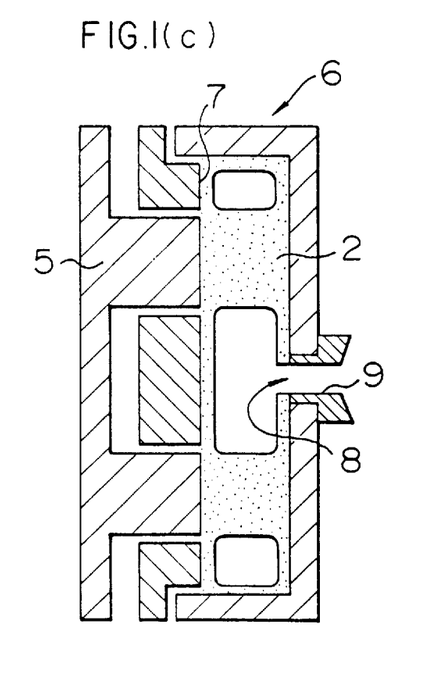
Figure 1D:
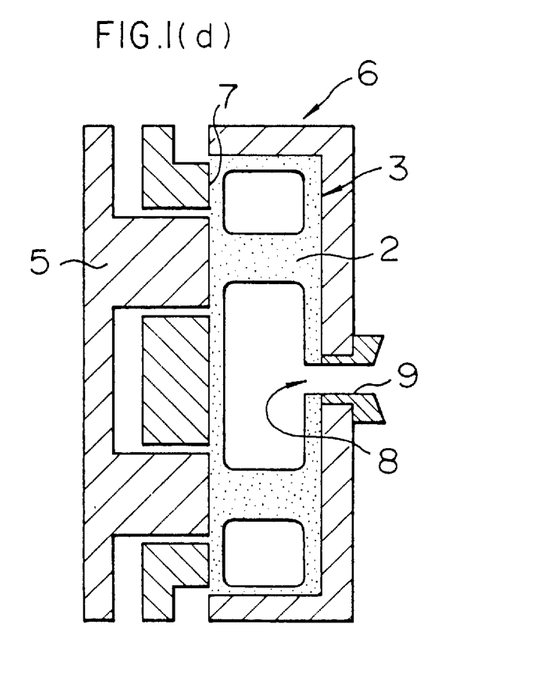
Figure 2:
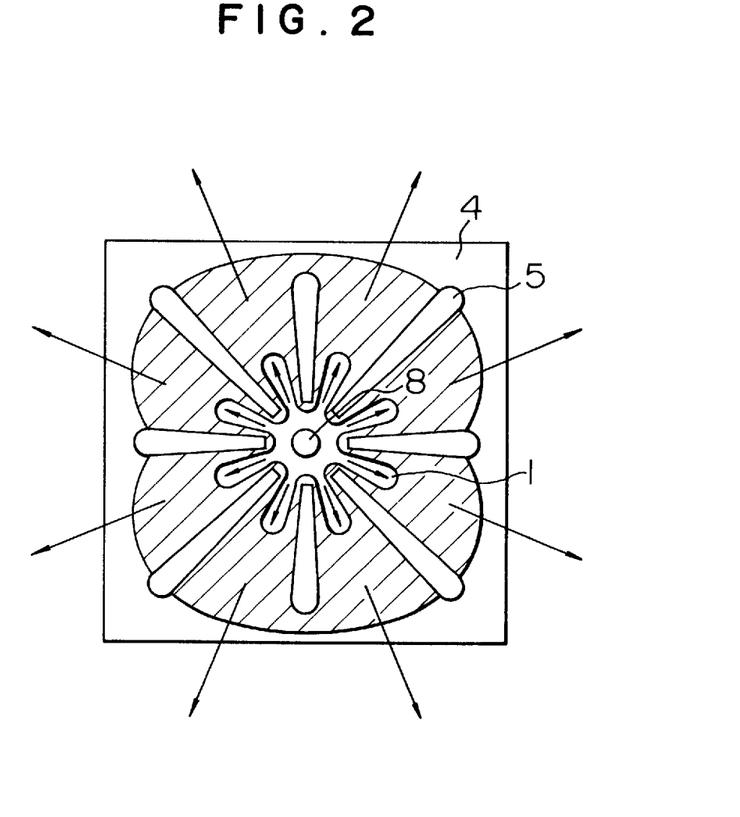
FIG. 2 is a view explaining other examples of a metal mold cavity.

As shown in FIG. 2, when the respective movable cores 5 are radially extended from the vicinity of a gate 8 as a center, the melted resin can be injected into the metal mold cavity 4 through this single gate 8 located at the center.

Figure 3:
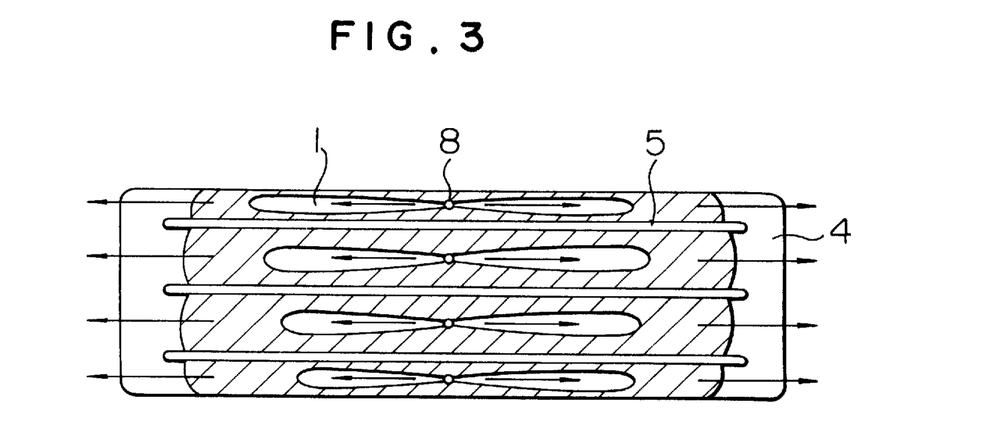
FIG. 3, is a view explaining other examples of a metal mold cavity.

Further, as shown in FIG. 3, when the respective movable cores 5 are disposed in parallel, the melted resin is difficult to be uniformly supplied between the respective movable cores 5 from a single location, and thus the melted resin may be supplied through a plurality of gates 8 disposed at the center between the respective movable cores 5.

Next, as shown in FIG. 1 (b), a pressurized fluid is introduced under pressure into the melted resin in the metal mold cavity 4 in the state in which the movable core 5 projects thereinto. In the case of a short shot, inner uncooled and movable melted resin in the metal mold cavity 4 is forced to the inner portion of the metal mold cavity 4 by the pressurized fluid and forms the hollow portion 1, while there remains the resin which comes into contact with the wall surface of the metal mold cavity 4 and the movable core 5 and which is cooled thereby and is thus difficult to flow. Further, in the case of a full shot, the hollow portion 1 is formed by introducing the pressurized fluid of an amount corresponding to the amount of volume contraction of the melted resin caused when it is cooled.

Usually, the pressurized fluid can be introduced under pressure into the metal mold cavity 4 from the gate 8 through the injection path of the melted resin. However, the pressurized fluid may be directly introduced under pressure into the metal mold cavity 4 by providing an inlet dedicated for the pressurized fluid with the metal mold cavity 4 without using the gate 8 as a supply port for the melted resin, depending upon the shape and the like of a target injection-molded hollow article. In particular, as shown in FIG. 3, when a plurality of the gates 8 are provided as supply ports for the melted resin, it is preferable that the pressurized fluid is sometimes directly supplied under pressure into tile metal mold cavity 4.

In the case of a short shot, the introduction under pressure of the pressurized fluid may be carried out together with the injection of the melted resin or after the completion of injection of a predetermined amount of the melted resin. In the case of the full shot, it is carried out after the completion of injection of a predetermined amount of the melted resin.

When the pressurized fluid is introduced under pressure together with the injection of the melted resin, it must be introduced into the metal mold cavity 4 in such a manner that the direction in which the pressurized fluid is introduced is aligned with the direction in which the melted resin is supplied so that the pressurized fluid is wrapped with the melted resin. This result can be achieved in such a manner that the pressurized fluid is introduced under pressure into the metal mold cavity 4 together with the melted resin from a sprue 9 through the gate 8 with the movable core 5 and gate 8 disposed as shown in FIGS. 2 and 3.

Simultaneously with, during, or after the supply under pressure of the above pressurized fluid, the movable core 5 is retracted from the projected position in the metal mold cavity 4 to a predetermined position, as shown in FIG. 1 (c). A gap created by the retraction of the movable core 5 is filled as a result of the movement of the resin in the periphery thereof and thus the support portion 2 is formed. Since this support portion 2 is securely formed at the position where the movable core 5 is disposed in accordance with the shape of the movable core 5, the support portion 2 having a desired shape can be formed at a desired position by suitably selecting the disposed position and shape of the movable core 5.

A position where the movable core 5 is disposed is selected as a position which must be reinforced by supporting two surfaces confronting on the opposite sides of the hollow portion 1 in accordance with the shape of an injection-molded hollow article to be molded, the size of the hollow portion 1 and the like. The movable core 5 is formed to a flat plate of, for example, a linear shape, wave shape, polygonal line shape and the like, or a pin having, for example, a circular, polygonal, or elliptic cross section or the like so that the obtained support portion 2 can be made into a wall or pillar having various shapes, and thus the size of the support portion 2 obtained can be adjusted by adjusting a length, thickness, diameter and the like of the movable core 5. Further, the movable core 5 can be disposed in various arrangements such as a radial arrangement, parallel line arrangement, grid arrangement, zigzag arrangement and the like. Further, the plate-shaped movable core 5 and pin-shaped movable core 5 may be mixedly disposed.

Although the movable core 5 can be formed to the various shapes as described above, it is preferably formed to a pin shape having a circular cross section, because in this case the movable core 5 can be mounted to a metal mold 6 only by drilling holes in the metal mold 6. The metal mold 6 can be easily machined. Further, in the case that the pin-shaped movable cores 5 are employed, when a long interval is provided therebetween, a pillar-shaped support portion 2 is formed, and when a short interval is provided therebetween, a wall-shaped support portion 2 is formed continuously between the movable cores 5.

The retraction of the movable core 5 is usually completed at a location where the extreme end of the movable core 5 substantially coincides with the cavity surface 7, and the support portion 2 can be formed without remaining projections and recesses on the surface of an injection-molded hollow article by retracting the movable core 5 to this location. When, however, there is formed an injection-molded hollow article 3 which is not subjected to any interference even if some projections and recesses are formed thereon, the retraction of the movable core 5 may be stopped in the state in which the extreme end of the movable core 5 projects into the metal mold cavity 4 or the movable core 5 may be retracted until the extreme end of the movable core 5 is retracted from the cavity surface 7 to some degree.

At the step shown in FIG. 1 (*c*), the resin in the metal mold cavity 4 is sufficiently cooled and then the metal mold 6 may be opened after the pressurized fluid in the hollow portion 1 has been discharged. However, the volume of the metal mold cavity is preferably increased by the movement of the cavity surface 7 shown in FIG. 1 (*d*) to further enlarge the hollow portion 1 and reduce the weight of the injection-molded hollow article obtained. This movement of the cavity surface 7 may be effected simultaneously with or after the beginning of the supply under pressure of the pressurized fluid at any time prior to, simultaneously with or after the retraction of the movable core 5. The cavity surface 7 may be moved by a usual method.

Although a cavity surface 7 to be moved is usually the cavity surface 7 on the side where the movable core 5 is provided, the cavity surface 7 on the opposite side or both cavity surfaces 7 in confrontation may be moved.

When the volume of the metal mold cavity is increased by the movement of the cavity surface 7 after the retraction of the movable core 5, the thickness and diameter of the support portion 2 can be made smaller than those of the movable core 5, while, when the volume is increased before the retraction of the movable core 5, the thickness and diameter of the support portion 2 can be made larger as compared with the case effected after the retraction of the movable core 5. The thickness and diameter of the support portion 2 obtained and the hollow ratio of the injection-molded hollow article obtained can be arbitrarily adjusted by adjusting the increase ratio of the volume of the metal mold cavity by the thickness and retracting distance of the movable core and the moving distance of the cavity surface 7, regardless of the timing at which the movable core 5 is retracted.

After the injection-molded hollow article 3 provided with the necessary hollow portion 1 and support portion 2 has been molded, the pressure in the hollow portion 1 is returned substantially to atmospheric pressure, the metal mold 6 is opened, and the injection-molded hollow article is taken out.

The pressurized fluid in the hollow portion 1 can be discharged in such a manner that an injection nozzle (not shown in FIG. 1) is removed from the metal mold 6 and the pressurized fluid is discharged into the atmosphere through the gate 8 and sprue 9. Further, the pressurized fluid can be withdrawn for reuse through a pressurized fluid nozzle contained in the injection nozzle or a withdrawal port provided in the injection nozzle in the state in which the injection nozzle is contacted to the metal mold 6.

The thus obtained injection-molded hollow article has holes defined by the portions to which the pressurized fluid has been introduced under pressure. When the pressurized fluid is introduced under pressure through the gate 8 of the metal mold 6, these holes can be capped by injecting a small amount of the melted resin after the pressurized fluid in the hollow portion 1 has been discharged.

Figure 4:
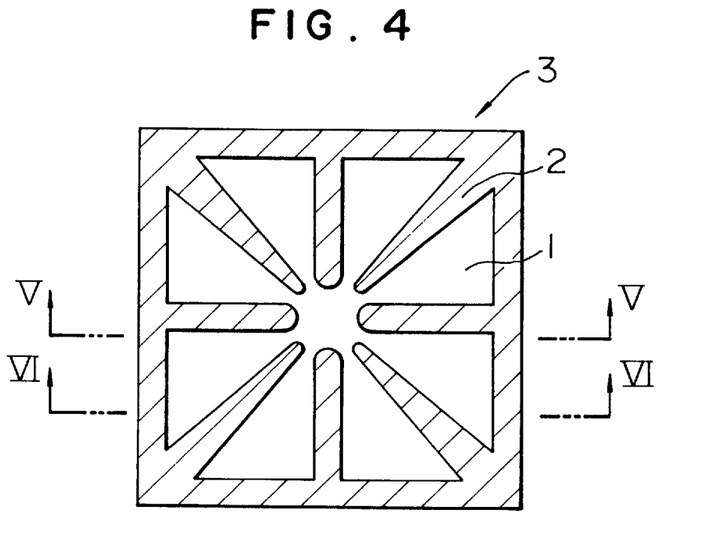
FIG. 4 is a horizontal cross sectional view showing an example of an injection-molded hollow article.
Figure 5:
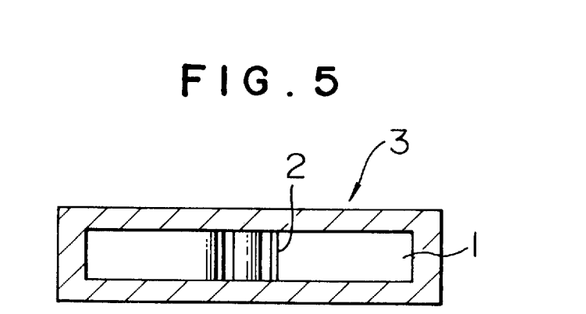
FIG. 5 is a cross sectional view taken along the line V—V of FIG. 4.
Figure 6:
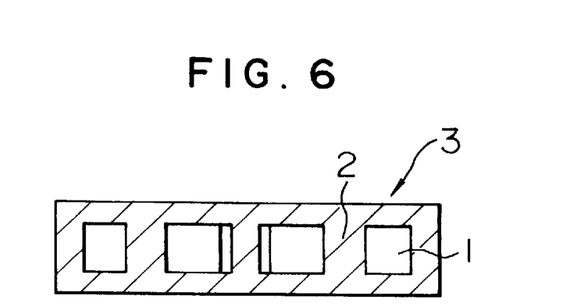
FIG. 6 is a cross sectional view taken along the line VI—VI of FIG. 4.
Figure 7:
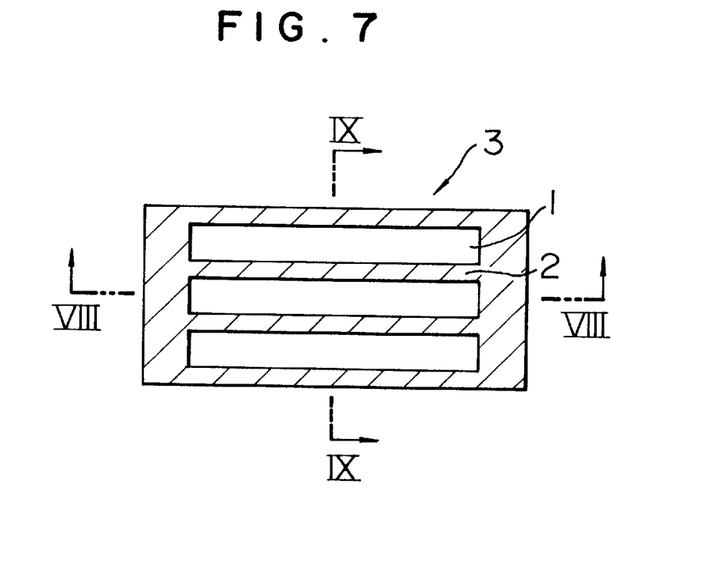
FIG. 7 is a horizontal cross sectional view showing other example of the injection-molded hollow member.
Figure 8:
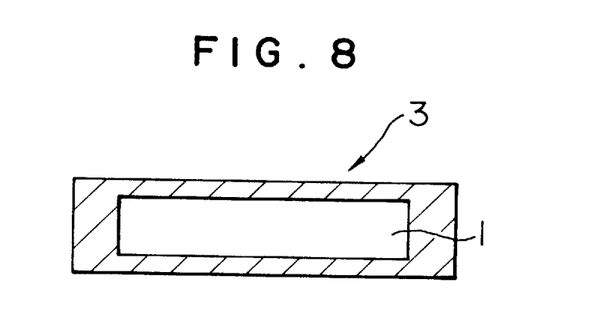
FIG. 8 is a cross sectional view taken along the line VIII—VIII of FIG. 7.
Figure 9:
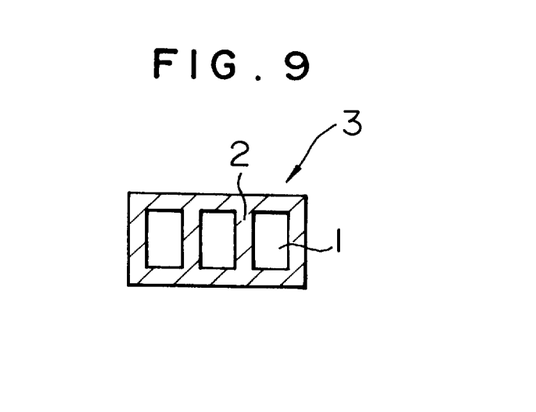
FIG. 9 is a cross sectional view taken along the line IX—IX of FIG. 7.
Figure 10:
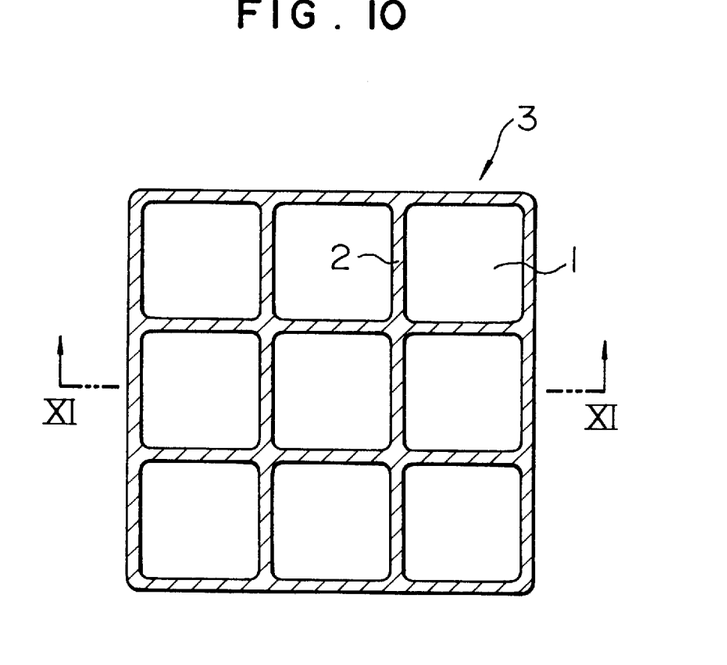
FIG. 10 is a horizontal cross sectional view showing another example of the hollow injection-molded article.
Figure 11:
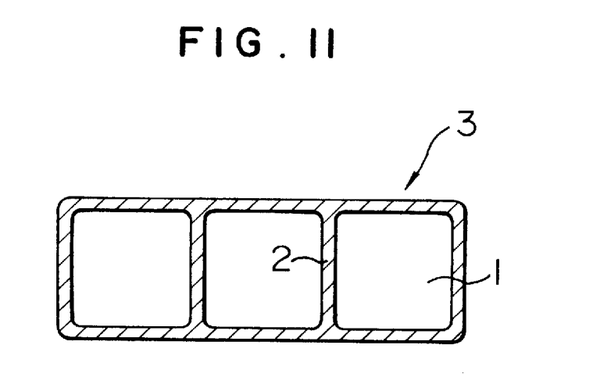
FIG. 11 is a cross sectional view taken along the line XI—XI of FIG. 10.

When a molding is carried out by using the metal mold 6 having the movable core 5 disposed therein as shown in FIG. 2, the injection-molded hollow -article shown in FIGS. 4–6 can be obtained. Further, when a molding is carried out by using the metal mold 6 having the movable cores 5 disposed therein as shown in FIG. 3, the injection-molded hollow article shown in FIGS. 7–9 can be obtained.

A pressurized fluid used in the present invention is such that it is in a gas or liquid state at room temperature and atmospheric pressure and not reacted or mixed with a resin in use at a temperature and pressure at which the resin is injected. More specifically, the pressurized fluid includes, for example, nitrogen gas, carbonic acid gas, air, helium gas, water, glycerin, liquid paraffin and the like. An inert gas such as nitrogen gas, helium gas or the like are preferable.

Next, a molding apparatus suitable for embodying a hollow injection molding method according to the present invention will be described with reference to FIG. 12.

Figure 12:
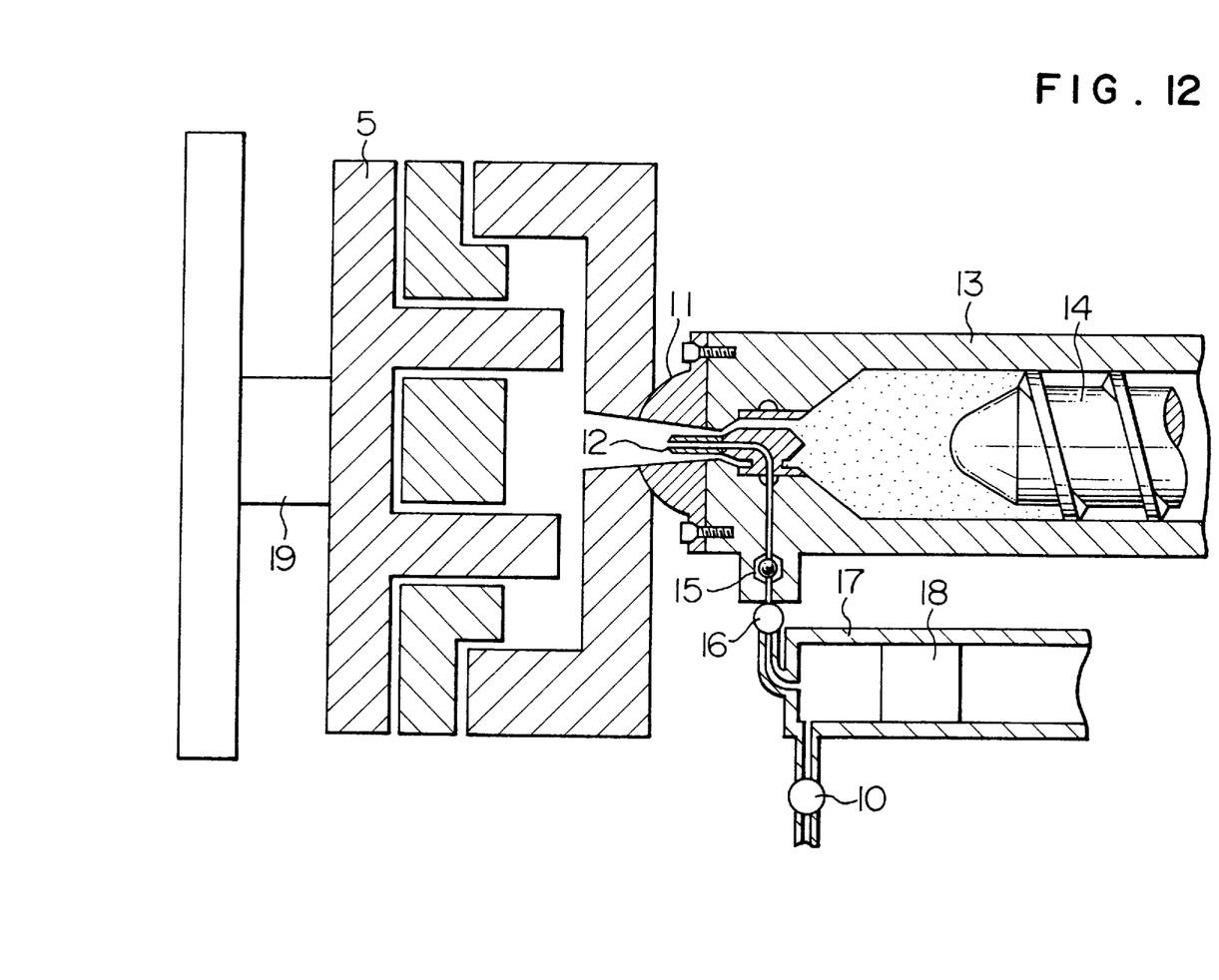
FIG. 12 is view explaining a molding apparatus suitable for the hollow injection molding method.

In FIG. 12, 11 designates an injection nozzle containing a pressurized fluid nozzle 12. Further, an injection cylinder 13 disposed rearwardly of the injection nozzle 11 is the one similar to a usual cylinder and includes a screw 14. When the screw 14 is advanced, a melted resin therein is pushed out and injected from the injection nozzle 11 through a gap around the pressurized fluid nozzle 12.

A compression cylinder 17 is connected to pressurized fluid nozzle 12 through a check valve 15 and valve 16. A pressurized fluid is compressed by the forward movement of the piston 18 in the compression cylinder 17 and maintained at a high pressure. Note that the pressurized fluid is introduced into the compression cylinder 17 from a pressurized fluid source (not depicted) by opening a valve 10.

Movable cores 5 are provided with a metal mold 6 located on the opposite side of the portion where the injection nozzle 11 is connected to the metal mold 5. These movable cores 5 can be advanced and retracted by a hydraulic cylinder 19, and when advanced, the movable cores 5 project into a metal mold cavity 4.

Although all the movable cores 5 are advanced and retracted at the same time by the single hydraulic cylinder 19 in the illustrated apparatus, it is also possible that the movable cores 5 are divided into groups and each group is advanced and retracted or each movable core 5 is advanced and retracted.

With the above apparatus, an injection-molded hollow article can be molded in accordance with the sequence described in FIG. 1 with the injection nozzle connected to the metal mold 6 as shown in FIG. 12.

EXAMPLES

Example 1

Figure 13:
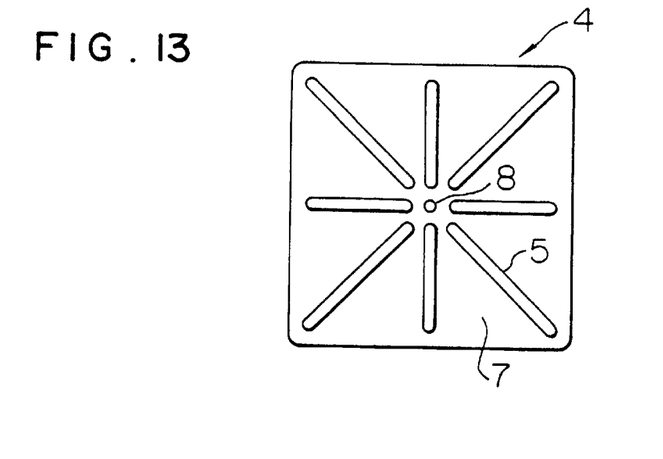
FIG. 13 is a plan view of the metal mold cavity of a metal mold used in Example 1.

FIG. 13 shows a plan view of a metal mold cavity 4 used in this embodiment. The metal mold cavity 4 is formed into a flat square plate shape of 200 mm×200 mm and has a gate 8 at the center thereof (on the opposite side of the portion where the movable cores 5 are provided). A melted resin and pressurized fluid are supplied under pressure from this gate 8 through a nozzle 11 containing a pressurized fluid nozzle 12 as described in FIG. 12.

The movable cores 5 are formed into a plate shape and composed of eight pieces of cores radially extending from the vicinity of the center of the gate 8, and a cavity surface 7 on the side where the movable cores 5 are disposed can be moved in a direction for increasing the volume of the metal mold cavity 4. Further, each of the movable cores 5 has a thickness of 6 mm.

Figures 14A, 14B, 14C:
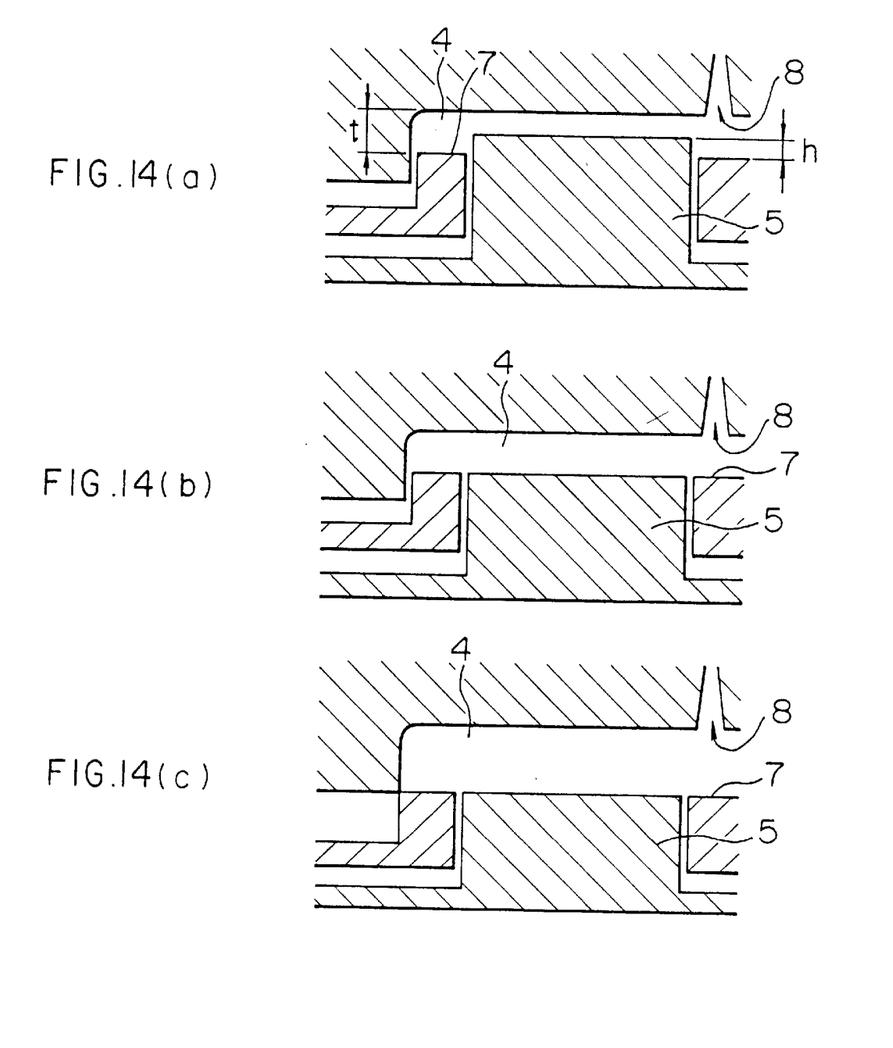
FIG. 14 is a view explaining an operation sequence of Example 1.

As shown in FIG. 14 (a), the position of the cavity surface 7 on the side where the movable cores 5 were disposed and the position of the movable cores 5 were adjusted prior to the injection of the melted resin so that the thickness t of the metal mold cavity 4 was adjusted to 16 mm and the length h of the movable cores 5 projected into the metal mold cavity 4 was adjusted to 8 mm.

High impact polystyrene melted by being heated to 220° C. was injected into the metal mold 6 in the above state in an amount of 70% of the volume of the metal mold cavity 4 in the above state and thereafter nitrogen gas having a pressure of 30 Kg/cm$^2$ was injected under pressure into the melted resin in the metal mold cavity 4.

After the supply under pressure of the nitrogen gas, the movable cores 5 were retracted by 8 mm to the position where the extreme end surfaces of the movable cores 5 coincided with the cavity surface 7 on the side where the movable cores 5 were disposed as shown in FIG. 14 (b), and thereafter the cavity surface 7 on the side where the movable cores 5 were disposed were moved by 10 mm together with the movable cores 5 and thus the volume of the metal mold cavity was increased as shown in FIG. 14 (c).

After the resin in the metal mold cavity had been cooled and solidified, the nitrogen gas injected under pressure was discharged and the metal mold was opened, and thus an injection-molded hollow article was taken out. The thus obtained injection-molded hollow article was light and had a surface on which no irregularities were formed with a thickness of 26 mm, weight of 471 g, hollow ratio of 52% and eight wall-shaped support portions were formed in the interior of the cross section of the injection-molded hollow article in correspondence with the positions of the movable cores in the metal mold. Each of the support portions had a minimum wall thickness of 2 mm and was radially extended from the center of the injection-molded hollow article and contiguous to the peripheral wall of the injection-molded hollow article. The injection-molded hollow article obtained was excellent in rigidity.

Example 2

A hollow injection molding was carried out by using the metal mold used in Example 1 in the same way as Example 1 except that the volume of a metal mold cavity was increased by moving a cavity surface on the side where movable cores were disposed prior to the retraction of the movable cores and thereafter the movable cores were retracted and the extreme end of the movable cores was caused to coincide with the cavity surface on the side where the movable cores were disposed.

Although a thus-obtained injection molded hollow article was substantially the same as the injection-molded hollow member obtained in Example 1; the formed support portions had their smaller portions with a thickness of 3 mm.

Example 3

A hollow injection molding was carried out by using the metal mold used in Example 1 in the same way as Example 1 except that the volume of a metal mold cavity was increased by the movement of a cavity surface performed simultaneously with the retraction of movable cores in the state in which the movable cores were projected into the metal mold cavity by 8 mm.

Although a thus-obtained injection-molded hollow member was substantially the same as the injection-molded hollow article obtained in Example 1, one of the surfaces thereof had irregularities and the formed support portions had their smallest portions with a thickness of 3 mm.

Comparative Example 1

A metal mold having the same size and shape as those of the metal mold used in Example 1 and not provided with movable cores was used.

First, one of the cavity surfaces (the cavity surface opposite to the side where a gate was disposed) was moved to thereby adjust the thickness of a metal mold cavity to 16 mm. Thereafter high impact polystyrene, melted by being heated to 220° C., was injected into the metal mold cavity in the above state in an amount of 70% of the volume of the metal mold cavity and thereafter nitrogen gas having a pressure of 30 Kg/cm$^2$ was introduced under pressure into the melted resin in the metal mold cavity.

After the supply under pressure of the nitrogen gas, the same cavity surface as the one described above was moved by 10 mm to thereby adjust the thickness of the metal mold cavity to 26 mm.

Although a thus-obtained injection-molded hollow article was light with a weight of 473 g and hollow ratio of 51.5%, support portions formed in the interior of the cross section thereof were not located at given positions and had an extremely large wall thickness toward the peripheral wall of the injection-molded hollow article and the wall thickness of the support portions was not uniform. Therefore, recesses were partially developed in the thick wall portion by thermal contraction.

Comparative Example 2

A hollow injection molding was carried out by the same method as Example 1 except that movable cores were not retracted and a cavity surface was not moved after the injection of the melted resin and the supply under pressure of a nitrogen gas as in the operation of Example 1.

A thus-obtained injection-molded hollow article had a thickness of 16 mm, width of 200 mm, length of 200 mm, weight of 471 g and a low hollow ratio of 26.4%, while irregularities were formed on one of the surfaces thereof. Formed support portions were thick with a minimum wall thickness of 9 mm and thus a prolonged cooling time was required.

Example 4

Figure 15:
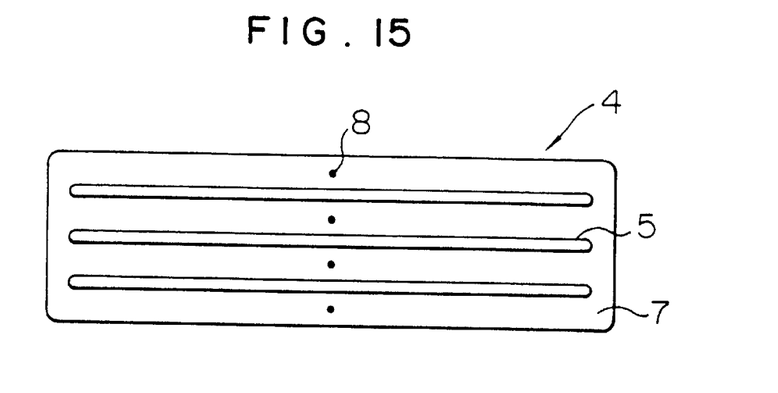
FIG. 15 is a plan view of the metal mold cavity of a metal mold used in Example 4.

FIG. 15 shows a plan view of a metal mold cavity 4 used in this example. The metal mold cavity 4 has a rectangular flat plate shape with a width of 110 mm and length of 385 mm, four gates 8 are provided at the center between respective movable cores 5 (on the side opposite to the portion where the movable core 5 is provided), and a melted resin and pressurized fluid are injected under pressure from these gates 8 through an injection nozzle 11 containing a fluid nozzle 12 as described in FIG. 12. Further, the diameter of the gates 8 and the diameter of a resin path upwardly of the gates 8 are adjusted so that the melted resin is uniformly supplied in the lengthwise direction of the metal mold cavity 4.

Movable cores 5 are formed into a plate shape and composed of three pieces of cores disposed at equal intervals in the width direction of the metal mold cavity 4 in parallel with each other, and a cavity surface 7 on the side where the movable cores 5 are disposed can be moved in a direction for increasing the volume of the metal mold cavity. Further, each of the movable cores 5 has a thickness of 7 mm and length of 379 mm.

Figure 16A:
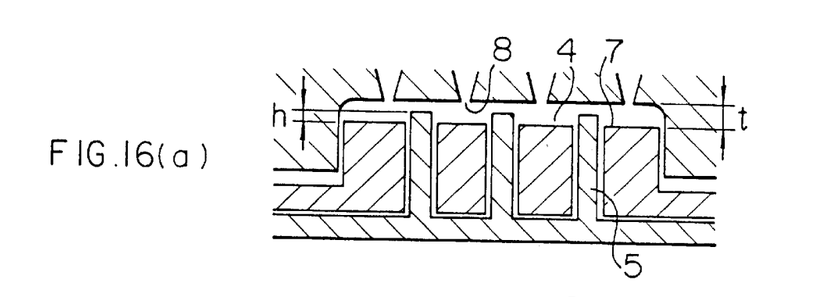
FIG. 16 is a view explaining an operation sequence of Example 4.
Figure 16B:
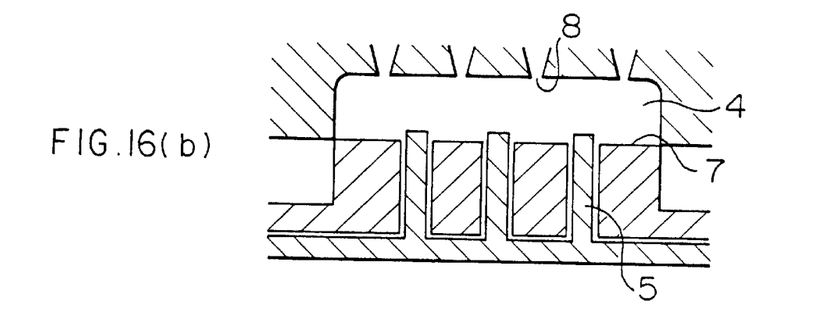
Figure 16C:
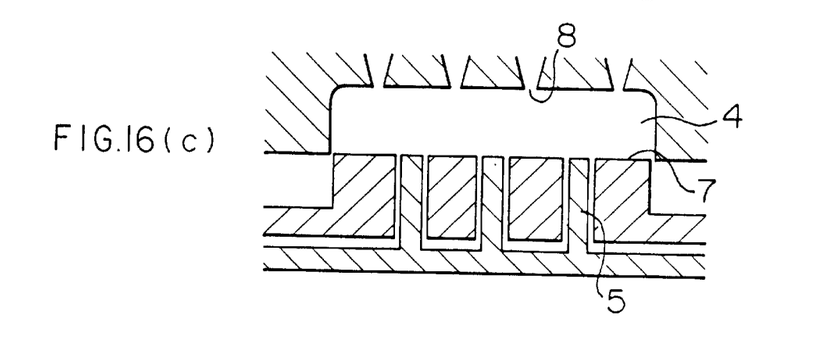

As shown in FIG. 16 (a), the position of the cavity surface 7 on the side where the movable cores 5 ere disposed and the position of the movable cores 5 ere adjusted so that the thickness t of the metal mold cavity 4 was adjusted to 6 mm and the length h of the movable cores 5 projected into the metal mold cavity 4 was adjusted to 3 mm.

High impact polystyrene, melted by being heated to 220° C., was injected and filled with the metal mold cavity 4 in the above state, and thereafter a nitrogen gas having a pressure of 30 Kg/cm$^2$ was introduced under pressure into the melted resin in the metal mold cavity 4.

At the same time as the supply under pressure of the nitrogen gas, the movable cores 5 and the cavity surface 7 on the side where the movable cores 5 were disposed were moved by 24 mm to thereby increase the volume of the metal mold cavity as shown in FIG. 16 (b), and thereafter the movable cores 5 were retracted by 3 mm to the position where the extreme end of the movable cores 5 was caused to coincide with the cavity surface 7 on the side where the movable cores 5 were disposed as shown in FIG. 16 (c).

After the resin in the metal mold cavity had been cooled and solidified, the nitrogen gas supplied under pressure was discharged and the metal mold was opened, and thus an injection-molded hollow article was taken out. The thus obtained injection-molded hollow article was light and had a surface on which no irregularities were formed with a thickness of 30 mm, weight of 233 g, hollow ratio of 82%, and three wall-shaped support portions were formed in the interior of the cross section of the injection-molded hollow article in correspondence with the positions of the movable cores in the metal mold. The support portions had a minimum wall thickness of 1.5 mm and were arranged in parallel in the width direction of the injection-molded hollow article and contiguous to the peripheral wall on the short side of the injection-molded hollow member. The injection-molded hollow article obtained was excellent in rigidity.

Example 5

Figure 17:
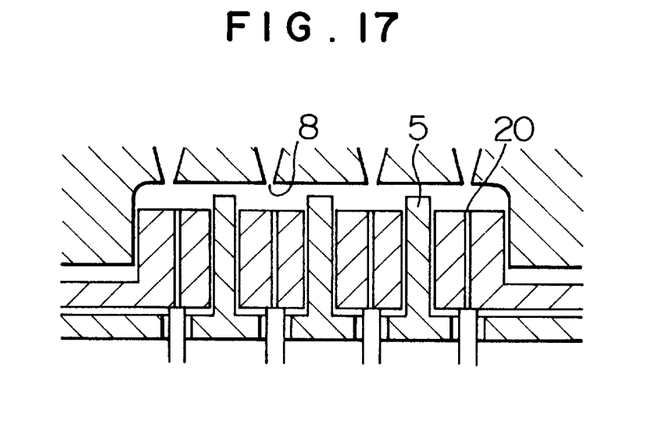
FIG. 17 is a view explaining a metal mold used in Example 5.

As shown in FIG. 17, a hollow injection molding was carried out in the same way as Example 4 except that a pressurized fluid supply port 20 was provided on the side where movable cores 5 were disposed and a pressurized fluid (nitrogen gas) was supplied under pressure from the pressurized fluid supply port 20 instead of the gates 8.

As a result, an injection-molded hollow article similar to Example 4 was obtained.

INDUSTRIAL APPLICABILITY

According to the present invention, there are provided a method of manufacturing a light injection-molded hollow article excellent in rigidity by forming support portions having a desired size located at desired positions to provide a large hollow ratio, this type of injection-molded hollow article and a metal mold for the injection-molded hollow article. Moreover, according to the present invention, an injection-molded hollow article having a large hollow ratio can be integrally molded and thus the present invention greatly contributes to the related industrial field.

We claim:

1. An injection molding method for producing a hollow article having (i) an outer portion and an inner chamber defined by said outer portion, and (ii) at least one internal support portion formed unitarily with said outer portion and disposed at a predetermined position within the chamber, comprising the steps of:

injecting a melted resin into a metal mold cavity, the surface of said cavity being defined by (a) a movable mold portion comprising at least one core portion separately and independently movable relative to the remainder of the movable mold portion, and (b) a nonmovable mold portion;

supplying under pressure a pressurized fluid into said metal mold cavity;

moving the at least one movable core portion separately from and independently of the remainder of the movable mold portion from a projected position to a predetermined position coincident with the rest of the movable mold portion so as to increase the volume of the metal mold cavity thereby forming from the injected melted resin said internal support portion unitarily with the formation of the rest of the article in the mold cavity.

2. An injection molding method according to claim 1, wherein the movement of said movable core portion is started at any time at the beginning of, during, or after the supply under pressure of said pressurized fluid.

3. An injection molding method according to claim 1, wherein said method further comprises a step of:

increasing the volume of the metal mold cavity and the volume of the inner chamber of the article by moving together both said at least one movable core portion and remainder of said movable mold portion prior to said step of moving the at least one movable core.

4. An injection molding method according to claim 3, wherein the step of increasing the volume of the metal mold cavity is started at any time at the beginning of, before, or after the beginning of movement of said movable core portion.

5. A metal mold for producing an injection molded hollow article having at least one internal support portion unitary with a plurality of sides of the article, the plurality of sides of the article defining an internal chamber, the metal mold defining a metal mold cavity and comprising a female mold portion and a movable male mold portion, said movable male mold portion comprising at least two movable parts including at least one movable core for movably projecting into said metal mold and a remainder movable mold portion capable of forming a flush male mold internal surface with said at least one movable core when said at least one movable core is in a non-projected state;

the movable core movable separately from and together with said remainder movable mold portion and being disposed at a position where a support portion is to be integrally connected to inner surfaces of the plurality of sides of the injection-molded hollow article to be molded and capable of projecting into the metal mold cavity toward said female mold portion and retracting from a projected position; and said metal mold having means for injecting a melted resin into the metal mold cavity and means for supplying under pressure a pressurized fluid into said metal mold cavity.

\* \* \* \* \*